United States Patent [19]
Hathaway et al.

[11] Patent Number: 5,978,898
[45] Date of Patent: Nov. 2, 1999

[54] ALLOCATING REGISTERS IN A SUPERSCALAR MACHINE

[75] Inventors: Robert G. Hathaway, Santa Clara; Ramesh K. Panwar, Pleasanton, both of Calif.

[73] Assignee: Intel Corporation, Santa Clara, Calif.

[21] Appl. No.: 09/183,689

[22] Filed: Oct. 30, 1998

[51] Int. Cl.$^6$ .................................................. G06F 12/00
[52] U.S. Cl. ............................................................ 712/208
[58] Field of Search .................................. 712/208, 225, 712/230, 23; 711/101

[56] References Cited

U.S. PATENT DOCUMENTS

| | | | |
|---|---|---|---|
| 5,367,651 | 11/1994 | Smith et al. | 395/709 |
| 5,367,684 | 11/1994 | Smith et al. | 395/700 |
| 5,890,000 | 3/1999 | Aizikowitz et al. | 395/709 |

*Primary Examiner*—David Y. Eng
*Attorney, Agent, or Firm*—Blakely, Sokoloff, Taylor & Zafman LLP

[57] ABSTRACT

A register allocator is provided including a plurality of N allocatable memory cells arranged in B banks having N/B rows each so that each of the N allocatable memory cells is capable of storing a register identifier. The register allocator includes a plurality of M parallel execution write data ports coupled to the plurality of N allocatable memory cells so as to be capable of writing a de-allocated register identifier to a first associated memory cell and a plurality of M parallel execution read data ports coupled to the plurality of N allocatable memory cells so as to be capable of reading an allocated register identifier from a second associated memory cell. The register allocator includes a plurality of M (N/B)-bit write enable ports coupled to the plurality of N allocatable memory cells by N/B 1-bit write entry ports and a plurality of M (N/B)-bit read enable ports coupled to the plurality of N allocatable memory cells by N/B 1-bit read entry ports. The register allocator also includes a decoded $(B-\delta_{1B}+N/B)$-bit head pointer decoded in a write decoder and coupled to the plurality of M (N/B)-bit write enable ports and a decoded $(B-\delta_{1B}+N/B)$-bit tail pointer decoded in a read decoder and coupled to the plurality of M (N/B)-bit read enable ports. Up to M of the plurality of N allocatable memory cells are allocatable on a first-in-first-out basis determined by respective positions of the decoded $(B-\delta_{1B}+N/B)$-bit head pointer a nd the decoded $(B-\delta_{1B}+N/B)$-bit tail pointer. The respective positions of the decoded $(B-\delta_{1B}+N/B)$-bit head pointer and the decoded $(B-\delta_{1B}+N/B)$-bit tail pointer are separately incrementable.

38 Claims, 7 Drawing Sheets

Cycle 0

| 0 | 1 | 2 | 3 | ← Tail Row Ptr (0001) |
|---|---|---|---|---|
| 4 | 5 | 6 | 7 | |

↑
Tail Bank Ptr (1000)

*FIG. 4a*

Cycle 1

| 0 | 1 | 2 | (3) | |
|---|---|---|---|---|
| (4 | 5) | 6 | 7 | ← Tail Row Ptr (0010) |

↑
Tail Bank Ptr (0100)

*FIG. 4b*

ALLOCATING REGISTERS IN A SUPERSCALAR MACHINE

BACKGROUND OF THE INVENTION

1. Field of the Invention

The invention relates generally to processors and computers. More particularly, the invention relates to allocating registers in an out-of-order, superscalar machine.

2. Description of the Related Art

In a superscalar microprocessor (also referred to herein as a "machine"), decoders produce a sequence of simpler hardware executable micro-operations ("micro-ops" or "$\mu$-ops") from a sequence of instructions (i.e., from macro-instructions) received from a fetcher. A typical feature in such machines (e.g., in an out-of-order, superscalar machine) is register renaming by a renamer. The renamer renames temporary destination registers of each micro-op from the decoders by allocating a previously de-allocated physical register (resource) in the machine to replace each of these temporary destination registers. To perform register renaming, the machine must have a pool of unused physical registers that can be allocated for each instruction that writes a register. As long as additional physical registers are available, the renamer continues to assign them for the temporary destination registers. The renamer may also record data on dependencies between the micro-ops and on the reassignment of additional physical registers in a dependency table. By so doing, the renamer can remove false dependencies from a sequence of instructions. The renamer assigns the renamed micro-op entries in a reorder buffer or queue and sends the micro-ops to a scheduler. The scheduler assigns instructions for execution in an order that may not follow the original order of the instruction sequence.

An allocator, included as part of the renamer, determines which physical registers are free and sends them to other portions of the renamer for assignment. Typically, a bit is reserved in an allocation or register status bit vector for each register and the status of that bit is an indication of whether the physical register is free or not. For example, a 32-bit register stat us bit vector may be used for a system having 32 registers (that have $2^{32}$ possible allocation/de-allocation states). A 1 value for a bit in the 32-bit register status bit vector may represent a free physical register and a 0 value may represent a physical register that is unavailable because it is already being used. To determine which physical registers are free, the allocator may have to search for the first occurrence of a bit value of 1 in the 32-bit register status bit vector. Such a search could be performed from the least significant bit ("LSB") side of the 32-bit register status bit vector, or from the most significant bit ("MSB") side, or from both sides. When a bit is found having a value of 1, the identification ("ID") of that physical register is sent to the other portions of the renamer.

In machines having, for example, a 128-bit register status bit vector instead of a 32-bit register status bit vector (a 128-bit register status bit vector may be used for a system having 128 registers having $2^{128}$ possible allocation/de-allocation states), it may be necessary to find four physical registers that are free for allocation each clock cycle. In such systems, the 128-bit register status bit vector may be searched for two bits having values of 1 from the LSB side and two other bits having values of 1 from the MSB side. A problem would occur, however, if only one physical register were available for renaming, in which case, two of these searches would provide no results (i.e., they would be empty), and the other two searches would provide the same result.

Considering again a machine having a 32-bit register status bit vector, the vector may be latched in a 32-bit wide flip-flop ("FF"). One de-allocated physical register may be allocated each clock cycle. A so-called "leading one" detector or "find first one" ("FF1") detector is used to identify the physical register that has been de-allocated by examining the 32-bit register status bit vector. The leading one detector converts all 1s to 0s except the least significant 1, which represents the physical register that is to be allocated. The resulting 32-bit vector is termed a 1 "hot" vector and represents a decoded binary number. This decoded binary number is typically encoded as a 5-bit binary number ID for the physical register that is to be allocated. Similarly, a 128-bit 1 "hot" vector represents a decoded binary number and would typically be encoded as a 7-bit binary number ID. More generally, an N-bit 1 "hot" vector represents a decoded binary number and would typically be encoded as an n-bit binary number ID, where $N=2^n$ (and, hence, $n = \log_2 N$). Typically, n is an integer and N is an integral power of 2. However, if $N=2^{(n+\alpha)}$ (and, hence, $(n+\alpha)=\log_2 N$), with $0<\alpha<1$, then such an N-bit decoded binary number may be encoded as an (n+1)-bit binary number ID, as is well-known.

Once the ID is available, a status register is updated, the 1-valued bit is cleared, and the ID is allocated (i.e., the ID is sent to another portion of the renamer for allocation of the corresponding physical register). The 1 of the leading one detector is inverted, with a value coming out of the register, and the leading one detector is latched for the next cycle.

For example, an 8-bit register status bit vector 01011100 indicates that registers $R_0$, $R_1$, $R_5$ and $R_7$ are unavailable because they have already been allocated and are being used, reading the 8-bit register status bit vector 01011100 from right to left, from LSB to MSB. However, registers $R_2$, $R_3$, $R_4$ and $R_6$ are available because they have not yet been allocated and are free to be used, again reading the 8-bit register status bit vector 01011100 from right to left, from LSB to MSB. The 8-bit register status bit vector 01011100 may be latched in an 8-bit wide FF and again, one de-allocated physical register may be allocated each clock cycle. A leading one detector converts all 1s to 0s except the least significant 1, yielding the 8-bit 1 "hot" vector 00000100, which is the decoded binary number that represents the physical register that is to be allocated. This decoded binary number 00000100 is encoded as a 3-bit binary number ID (010) representing the physical register ($R_2$) that is to be allocated. In general, the encoded value representing the physical register $R_i$, for $I=0, 1, 2, \ldots, 7$, is given by the 3-bit binary value of (i).

The updated 8-bit register status bit vector 01011000, reflecting the allocation of the physical register $R_2$ (assuming that no physical registers were de-allocated during the immediately preceding clock cycle), may then be latched in the 8-bit wide FF, and the leading one detector again converts all 1s to 0s except the least significant 1, yielding the 8-bit 1 "hot" vector 00001000, which is the decoded binary number that represents the next physical register ($R_3$) that is to be allocated. This decoded binary number 00001000 is encoded as the 3-bit binary number ID (011) representing the physical register ($R_3$) that is to be allocated.

The updated 8-bit register status bit vector 01010001, reflecting the allocation of the physical register $R_3$, as well as the de-allocation of the physical register $R_0$ during the immediately preceding clock cycle, may then be latched in the 8-bit wide FF, and the leading one detector again converts all 1s to 0s except the least significant 1, yielding the 8-bit 1 "hot" vector 00000001, which is the decoded binary number that represents the next physical register ($R_0$) that is to be allocated. This decoded binary number 00000001 is encoded as the 3-bit binary number ID (000) representing the physical register ($R_0$) that is to be allocated. An updated 8-bit register status bit vector 01010000, reflecting the allocation of the (recently de-allocated) physical register $R_0$ (assuming that no physical registers were de-allocated during the immediately preceding clock cycle), may then be latched in the 8-bit wide FF, and the leading one detector is again latched for the next cycle, and so forth.

One problem associated with this typical allocation procedure is that, as the size of the physical register pool N increases, it takes longer to find a free physical register. The present invention is directed to avoiding, or at least reducing, this problem and other problems.

SUMMARY OF THE INVENTION

A register allocator is provided including a plurality of N allocatable memory cells arranged in B banks having N/B rows each so that each of the N allocatable memory cells is capable of storing a register identifier. The register allocator includes a plurality of M parallel execution write data ports coupled to the plurality of N allocatable memory cells so as to be capable of writing a de-allocated register identifier to a first associated memory cell and a plurality of M parallel execution read data ports coupled to the plurality of N allocatable memory cells so as to be capable of reading an allocated register identifier from a second associated memory cell. The register allocator includes a plurality of M (N/B)-bit write enable ports coupled to the plurality of N allocatable memory cells by N/B 1-bit write entry ports and a plurality of M (N/B)-bit read enable ports coupled to the plurality of N allocatable memory cells by N/B 1-bit read entry ports. The register allocator also includes a decoded $(B-\delta_{1B}+N/B)$-bit head pointer decoded in a write decoder and coupled to the plurality of M (N/B)-bit write enable ports and a decoded $(B-\delta_{1B}+N/B)$-bit tail pointer decoded in a read decoder and coupled to the plurality of M (N/B)-bit read enable ports. Up to M of the plurality of N allocatable memory cells are allocatable on a first-in-first-out basis determined by respective positions of the decoded $(B-\delta_{1B}+N/B)$-bit head pointer and the decoded $(B-\delta_{1B}+N/B)$-bit tail pointer. The respective positions of the decoded $(B-\delta_{1B}+N/B)$-bit head pointer and the decoded $(B-\delta_{1B}+N/B)$-bit tail pointer are separately incrementable.

BRIEF DESCRIPTION OF THE DRAWINGS

Other objects and advantages of the invention will become apparent upon reading the following detailed description and upon reference to the drawings in which:

FIG. 4a is a block diagram illustrating an example of how partially decoded pointers are added;

FIG. 4b is a block diagram illustrating an example of how partially decoded pointers are added;

Figure 1:
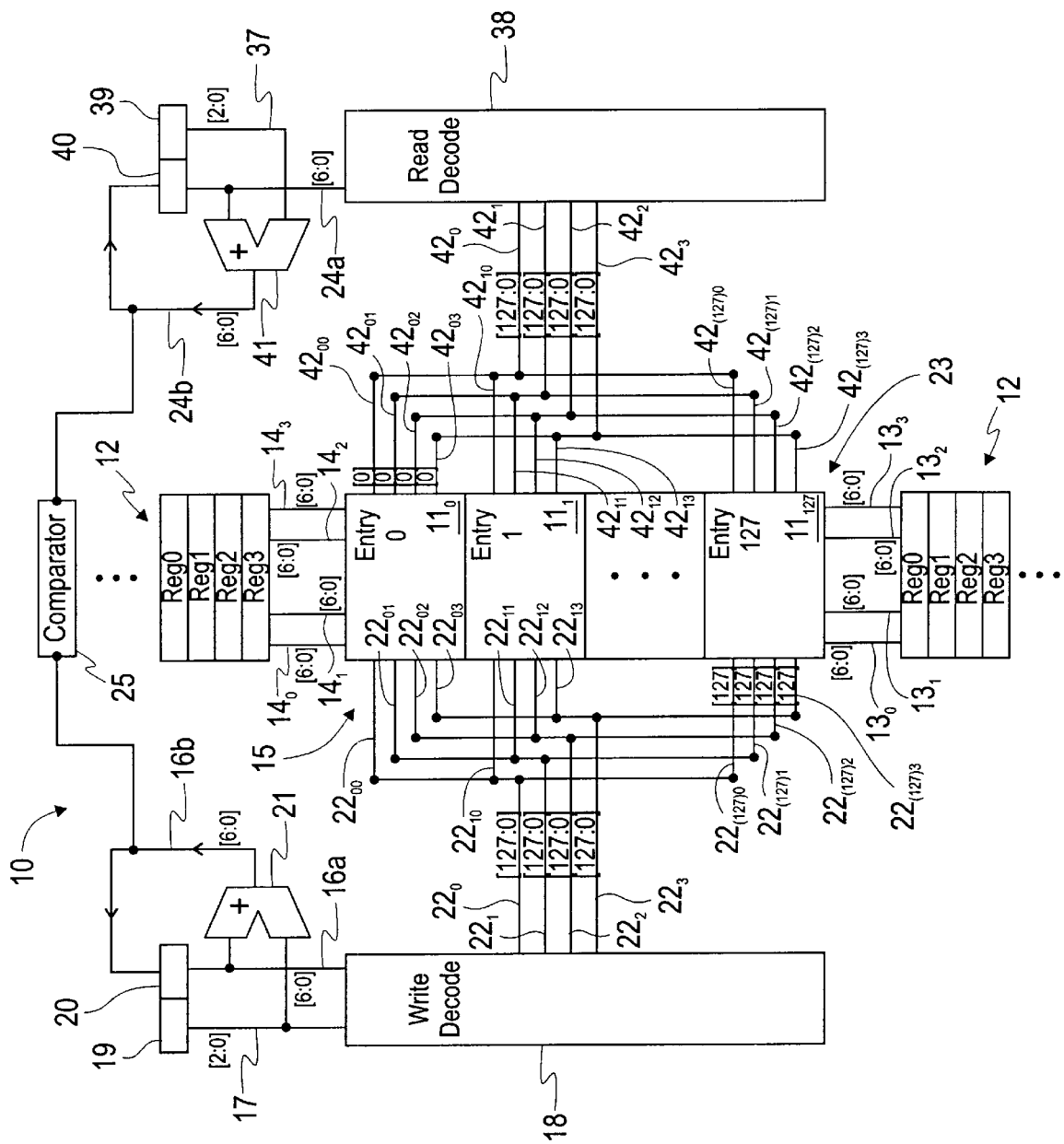
FIG. 1 shows a block diagram of an apparatus for performing register allocation in accordance with a first embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention is related to determining which physical registers may be allocated for register renaming in an out-of-order ("OOO"), superscalar microprocessor, and does not employ a register status bit vector approach. The register pool may include resources of general purpose registers, floating point registers, predicate registers, scheduler entries and Re-Order Queue ("ROQ") entries, for example. In embodiments of the present invention, the time required to find an available physical register is not dependent on the size of the pool of registers. As the pool size increases, de-allocated physical registers are identified faster, compared to previous methods, because the algorithm is the same regardless of the size of the pool. These embodiments use a first-in-first-out ("FIFO") memory or queue for each type of resource, and each FIFO memory has an entry (cell) for each of the register identifications ("IDs") of the physical registers of the corresponding type of resource in the machine. Each entry cell may be constructed using a standard register. The FIFOs are smaller and operate more simply than the previously used hardware discussed above. Moreover, the present invention includes a FIFO for each type of resource.

One exemplary implementation, in accordance with an embodiment of the invention, includes four write ports and four read ports for each of the entries. This embodiment is useful when the de-allocated register IDs are being written to a FIFO as many as four at a time as they become de-allocated. This embodiment is also useful when the allocated register IDs are being read from a FIFO as many as four at a time as they become requested. The destination, or source, entry in the FIFO would be determined by decoders, such as, for example, standard decoders. Another embodiment uses four banks of entries within a FIFO, where each bank has one write port and one read port for each entry. This would result in the use of fewer read/write ports for each of the entries.

Referring now to the drawings, FIG. 1 is a block diagram of a register allocator 10. The register allocator 10 includes a circular FIFO memory 11 or queue (or equivalent) that is used to perform register allocation in an out-of-order ("OOO"), superscalar machine (not shown), in accordance with an embodiment of the invention. The allocator 10 manages a pool of unused physical registers (not shown) using their register IDs 12. The encoded register IDs 12 are of sufficient size for the total number of physical registers in the machine. For example, for a machine having 32 physical registers, the encoded register IDs 12 are 5 bits wide, and for a machine having 128 physical registers, the encoded register IDs are 7 bits wide. The unused physical registers have been freed up or de-allocated by retirement of a previously issued instruction or by a flushing operation. The unused physical registers may be allocated as source or destination registers after a decode stage (not shown) in the out-of-order, superscalar machine, as will be appreciated by those skilled in the art.

The embodiment shown in FIG. 1 is used in a high-speed superscalar microprocessor. Each of N memory cells or entries $11_0, 11_1, \ldots, 11_{N-1}$ that make up the FIFO 11 requires a respective $\log_2$ N-bit read port $13_i$ (i.e., $13_{i0}, 13_{i1}, \ldots, 13_{i(M-1)}$, for i=0, 1, $\ldots$, M−1) and a respective $\log_2$ N-bit write port $14_i$ (i.e., $14_{i0}, 14_{i1}, \ldots, 14_{i(M-1)}$, for i=0, 1, $\ldots$, M−1) for each of the M parallel execution ports (e.g., M=4, as shown in the exemplary embodiment of FIG. 1) in the machine for reading and writing the register IDs 12, respectively (assuming that $N=2^n$). Typically, as discussed above, n is an integer and N is an integral power of 2. However, if $N=2^{(n+\alpha)}$ (and, hence, $(n+\alpha)=\log_2 N$), with $0<\alpha<1$, then such an N-bit decoded binary number may be encoded as an (n+1)-bit binary number ID, as is well-known, and each of $N=2^{(n+\alpha)}$ memory cells or entries $11_0, 11_1, \ldots, 11_{N-1}$ that make up the FIFO 11 would require a respective (n+1)-bit read port $13_i$ (i.e., $13_{i0}, \ldots, 13_{i(M-1)}$, for i=0, 1, $\ldots$, M−1) and a respective (n+1)-bit write port $14_i$ (i.e., $14_{i0}, 14_{i1}, \ldots, 14_{i(M-1)}$, for i=0, 1, $\ldots$, M−1) for each of the M parallel execution ports.

For a highly superscalar machine, the number M of these parallel execution ports ($13_i$ and $14_i$, for i=0, 1, $\ldots$, M−1) will dictate the size of the memory cells $11_0, 11_1, \ldots, 11_{N-1}$. In order to maximize machine efficiency, the number of registers IDs 12 written to, and read from, the FIFO 11 for each clock cycle will be equal to the number M of parallel execution ports ($14_0, 14_1, \ldots, 14_{M-1}$ and $13_0, 13_1, \ldots, 13_{M-1}$, respectively) of the superscalar machine. For example, the number of FIFO 11 entries $11_0, 11_1, \ldots, 11_{N-1}$ being written to, or read from, each clock cycle in the embodiment in FIG. 1 is limited to the number M=4 of these parallel execution ports ($14_0, 14_1, 14_2, 14_3$ and $13_0, 13_1, 13_2, 13_3$, respectively). Consequently, no more than M=4 consecutive entries in the memory cells $11_0, 11_1, \ldots, 11_{N-1}$ are written to, or read from, each clock cycle, as a result of the circular FIFO 11 implementation.

Moreover, because the memory cells $11_0, 11_1, \ldots, 11_{N-1}$ are used so frequently, the number M of the $\log_2$ N-bit read ports $13_i$ (i.e., $13_{i0}, 13_{i1}, \ldots, 13_{i(M-1)}$, for i=0, 1, $\ldots$, M−1) and the $\log_2$ N-bit write ports $14_i$ (i.e., $14_{i0}, 14_{i1}, \ldots, 14_{i(M-1)}$, for i=0, 1, $\ldots$, M−1) will dictate the size of the entire structure (i.e., the size of the allocator 10). However, this need not always be the case, as will be discussed below.

The number (N) of entries $11_0, 11_1, \ldots, 11_{N-1}$ included in the FIFO 11 corresponds to the number of physical registers in the machine (e.g., N=128 entries, as shown in FIG. 1), which maximizes machine throughput and allows for the possibility of renaming all of the machine's registers. The number (N) of registers determines the size (i.e., the number n=$\log_2$ N of bits, assuming that $N=2^n$) required for other elements of the allocator 10, as will be discussed below. When a register becomes available for allocation (i.e., when the register is de-allocated), the register's ID 12 is written (in encoded form) at a head position 15 of the FIFO 11 at the next available one of the entries $11_0, 11_1, \ldots, 11_{N-1}$ as indicated by an encoded head pointer 16a having $\log_2$ N bits (assuming that $N=2^n$).

In the allocator 10, the write operation of the de-allocated register IDs 12 to the FIFO 11 involves the head pointer 16a being encoded by a standard write encoder/decoder 18. In the exemplary embodiment shown in FIG. 1, for 128 physical registers, the encoded head pointer 16a is 7 bits wide and the encoded number of register writes request signal $M_{RegWriteReq}$ 17 is 3 bits wide because decimal numbers 0–4 (binary 000–100) are encoded, as shown in FIG. 1. The number of register writes request signal $M_{RegWriteReq}$ 17 is latched in a flip-flop ("FF") latch 19 and the head pointer 16a is latched in a FF latch 20, both of which are input to an adder 21 that generates the next head pointer 16b. As new de-allocated register IDs 12 are written to the next empty entries $11_0, 11_1, \ldots, 11_{N-1}$, the head pointer 16a is incremented. The head pointer 16a is modulo N incremented by the adder 21 so that the head pointer 16a can wrap around the FIFO 11, which is preferably circular, when the head pointer 16a advances past the last entry $11_{N-1}$.

The write encoder/decoder 18 decodes the head pointer 16a, and is coupled to each of the entries $11_0, 11_1, \ldots, 11_{N-1}$ of the FIFO 11 via M write enable ports $22_0, 22_1, \ldots, 22_{M-1}$ that are N bits wide each (e.g., M=4 write enable ports $22_0, 22_1, 22_2, 22_3$ that are 128 bits wide each, as shown in FIG. 1), and via NM write entry ports $22_{00}, 22_{01}, \ldots, 22_{0(M-1)}, 22_{10}, 22_{11}, \ldots, 22_{1(M-1)}, \ldots, 22_{(N-1)0}, 22_{(N-1)1}, \ldots, 22_{(N-1)(M-1)}$ that are 1 bit wide each (e.g., NM=512 write entry ports $22_{00}, 22_{01}, 22_{02}, 22_{03}, 22_{10}, 22_{11}, 22_{12}, 22_{13}, \ldots, 22_{(127)0}, 22_{(127)1}, 22_{(127)2}, 22_{(127)3}$, as shown in FIG. 1). The number M of parallel execution ports ($14_0, 14_1, \ldots, 14_{M-1}$) used in the processor is M=4 per clock cycle in the exemplary embodiment in FIG. 1, which means that up to M=4 of the entries $11_0, 11_1, \ldots, 11_{N-1}$ may be requested to be written to during every clock cycle, as determined by the number of register writes request signal $M_{RegWriteReq}$ 17 and the position of the head pointer 16a.

When an instruction requests a physical register, that request is serviced by reading the next available register ID 12 at a tail position 23 of the FIFO 11 as indicated by a tail pointer 24a. The tail pointer 24a is incremented in a similar manner to the incrementing of the head pointer 16a. When either the head pointer 16a or the tail pointer 24a reaches the last entry (e.g., $11_{N-1}$) in the FIFO 11 and is then advanced or incremented, the respective pointer wraps around to the first entry in the FIFO 11 (e.g., $11_0$). The head pointer 16a typically leads the tail pointer 24a, although in alternative embodiments, the reverse arrangement can be made, as will be appreciated by those skilled in the art. This is because whether de-allocated register IDs 12 enter the FIFO 11 at the head 15 and are allocated from the tail position 23, or vice versa, is somewhat arbitrary, according to design variations, if a circular FIFO 11 is employed. The reversed embodiments will operate analogously to the above-described register allocator 10.

For the FIFO 11 to function properly, the tail pointer 24a points to one of the entries $11_0, 11_1, \ldots, 11_{N-1}$ that is at least one removed from an entry (e.g., less than an entry) to which the head pointer 16a points. However, when no registers are in use or all registers are in use, the head pointer and tail pointer point to the same entry. Typically, the tail pointer 24a points to the entry which contains the register ID of the oldest deallocated (available) register in a sequence of entries containing de-allocated resister IDs. The head pointer 16a typically points to an empty entry which previously contained the register ID 12 of the oldest allocated (unavailable) register. This is because the machine allocates the next register from the tail pointer 24a. Therefore, the tail pointer 24a points to an entry containing the register ID 12 of an available register. When the next register is de-allocated, that register's register ID 12 is written into the entry pointed to by the head pointer 16a. Thus, the head pointer 16a points to an empty FIFO entry. Comparison control logic 25 (e.g., a comparator) in FIG. 1 monitors whether an entry is empty or full.

Typically, the head pointer 16a leads the tail pointer 24a. For example, upon initialization, the head pointer=decimal 128 (binary 10000000) and the tail pointer=decimal 0 (binary 0000000). Since decimal 128 can not be encoded in 7 bits, the binary representation of 128 and 0 are the same, i.e., 0000000. Thus, when the head pointer 16a and tail pointer 24a are equal, i.e., point to the same entry, the FIFO is completely full or completely empty. If the FIFO 11 is full, (all registers are de-allocated) all of the entries $11_0, 11_1, \ldots, 11_{N-1}$ are full (they all contain valid register IDs). Alternatively, if the FIFO 11 is empty, (all registers are allocated) all of the entries $11_0, 11_1, \ldots, 11_{N-1}$ are empty. Entries are never de-allocated once the FIFO is completely full, i.e., the head pointer 16a never stores a de-allocated register ID 12 to one of the entries $11_0, 11_1, \ldots, 11_{N-1}$ that already stores a de-allocated register ID 12, as indicated by the tail pointer 24a. Therefore, the head pointer never passes the tail pointer. As entries are allocated, the tail pointer starts to approach the head pointer. When the tail pointer catches up to and is equal to the head pointer, the FIFO is completely empty. To distinguish between completely full and completely empty, an extra bit (the wrap bit) is kept for each pointer. In the implementation of FIG. 1, this would simply be the MSB of an 8-bit binary encoded head pointer and tail pointer. Although entries are never de-allocated once the FIFO is completely full, entries can be allocated when the FIFO is completely empty. This happens when the tail pointer passes the head pointer. When this happens, an error (i.e., a stall) will occur.

In the allocator 10, the read operation of the allocated register IDs 12 from the FIFO 11 involves the tail pointer 24a being encoded by a standard read encoder/decoder 38. In the exemplary embodiment shown in FIG. 1, for 128 physical registers, the encoded tail pointer 24a is 7 bits wide and the encoded number of register reads request signal $M_{RegReadReq}$ 37 is 3 bits wide, as shown in FIG. 1. The number of register reads request signal $M_{RegReadReq}$ 37 is latched in a FF latch 39 and the tail pointer 24a is latched in a FF latch 40, both of which are input to an adder 41 that generates the next tail pointer 24b. As new allocated register IDs 12 are read from the next full entry $11_0, 11_1, \ldots, 11_{N-1}$ the tail pointer 24a is incremented. The tail pointer 24a is modulo N incremented by the adder 41 so that the tail pointer 24a can wrap around the FIFO 11, which is preferably circular, when the tail pointer 24a advances past the last entry $11_{N-1}$.

The read encoder/decoder 38 decodes the tail pointer 24a, and is coupled to each of the entries $11_0, 11_1, \ldots, 11_{N-1}$ of the FIFO 11 via M read enable ports $42_0, 42_1, \ldots, 42_{M-1}$ that are N bits wide each (e.g., M=4 read enable ports $42_0, 42_1, 42_2$ and $42_3$ that are 128 bits wide each, as shown in FIG. 1), and via NM write entry ports $42_{00}, 42_{01}, \ldots, 42_{0(M-1)}, 42_{10}, 42_{11}, \ldots, 42_{1(M-1)}, \ldots, 42_{(N-1)0}, 42_{(N-1)1}, \ldots, 42_{(N-1)(M-1)}$ that are 1 bit wide each (e.g., NM=512 write entry ports $42_{00}, 42_{01}, 42_{02}, 42_{03}, 42_{10}, 42_{11}, 42_{12}, 42_{13}, \ldots, 42_{(127)0}, 42_{(127)1}, 42_{(127)2}, 42_{(127)3}$, as shown in FIG. 1). The number M of parallel execution ports $(13_0, 13_1, \ldots, 13_{M-1})$ used in the processor is M=4 per clock cycle in the exemplary embodiment in FIG. 1, which means that up to M=4 of the entries $11_0, 11_1, \ldots, 11_{N-1}$ may be requested to be read during every clock cycle, as determined by the number of register reads request signal $M_{RegReadReq}$ 37 and the position of the tail pointer 24a.

Figure 2A:
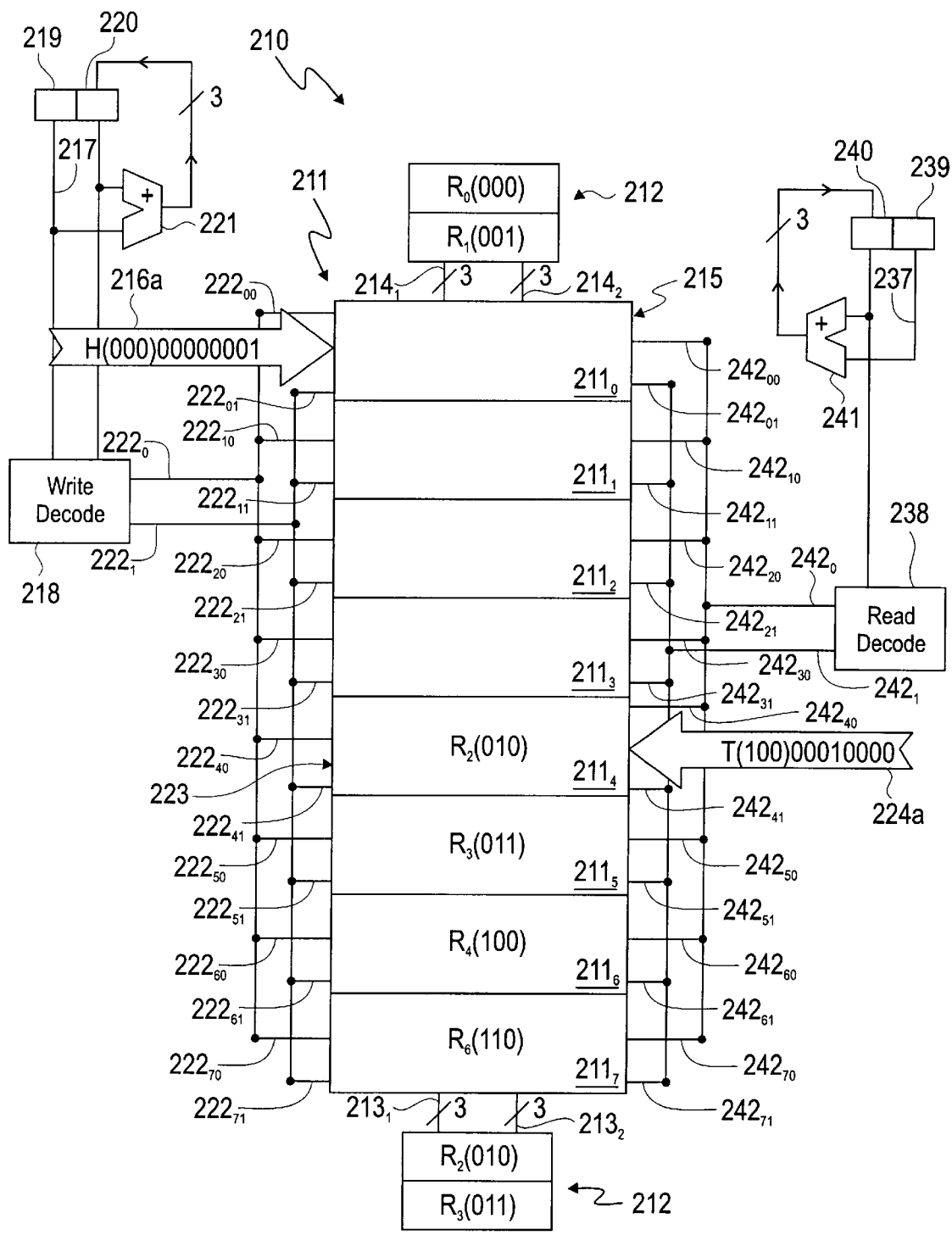
FIG. 2a shows a block diagram of an apparatus for performing register allocation in accordance with the first embodiment shown in FIG. 1, for N=8, M=2 and B=1.
Figure 2B:
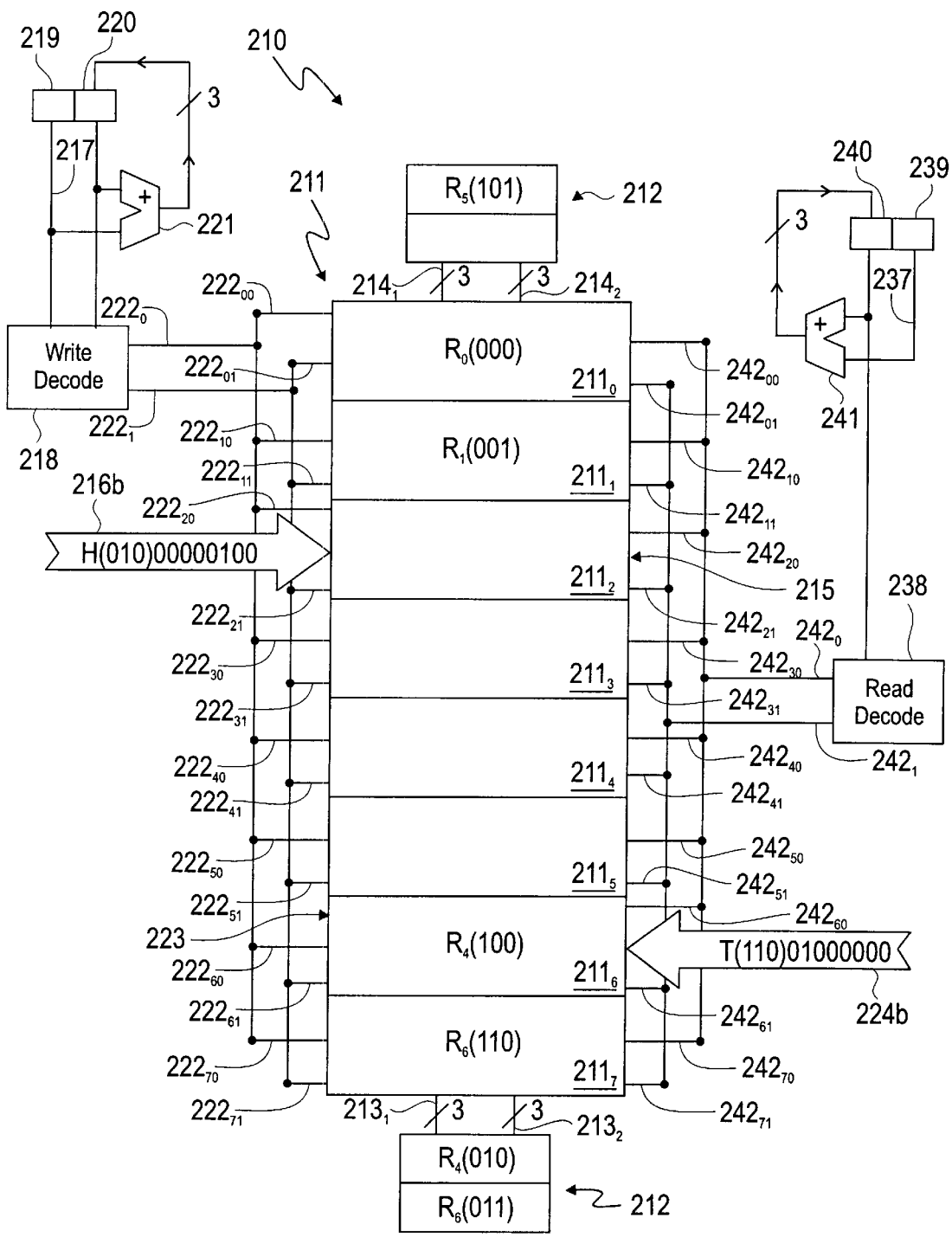
FIG. 2b also shows a block diagram of an apparatus for performing register allocation in accordance with the first embodiment shown in FIG. 1, for N=8, M=2 and B=1.
Figure 2C:
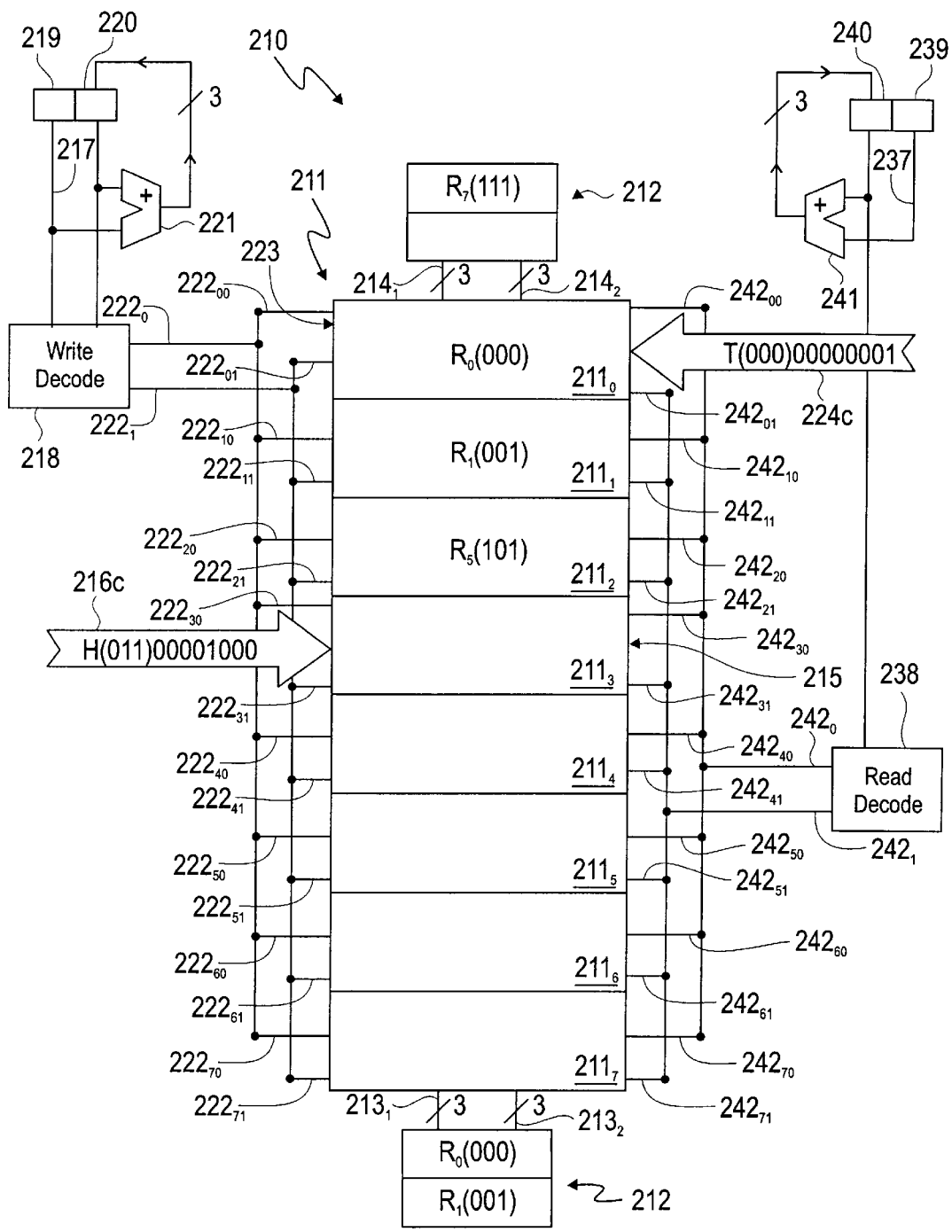
FIG. 2c also shows a block diagram of an apparatus for performing register allocation in accordance with the first embodiment shown in FIG. 1, for N=8, M=2 and B=1.

For example, as shown in FIGS. 2a–c, consider the case when N=8 and M=2. The status of the allocated and de-allocated physical registers may be represented by an 8-bit register status bit vector 01011100, which indicates that registers $R_0$, $R_1$, $R_5$ and $R_7$ are unavailable because they have already been allocated and are being used, reading the 8-bit register status bit vector 01011100 from right to left, from LSB to MSB, bit positions having a zero indicate that the registers corresponding to those bit positions are unavailable. However, registers $R_2$, $R_3$, $R_4$ and $R_6$ are available because they have not yet been allocated and are free to be used, again reading the 8-bit register status bit vector 01011100 from right to left, from LSB to MSB, bit positions having a one indicate that the registers corresponding to those bit positions are available.

FIGS. 2a–c show block diagrams of a register allocator 210. The register allocator 210 includes a circular FIFO memory 211. The register allocator 210 manages a pool of unused physical registers (not shown) using their register IDs 212 (000, 001 for registers $R_0$, $R_1$, respectively). The encoded register IDs 212 are of sufficient size for the total number of physical registers in the machine, as shown. For this example, since the machine has 8 physical registers, the encoded register IDs 212 are 3 bits wide. In general, the encoded value of the register ID 212 for physical register $R_i$, for i=0, 1, ..., 7, is given by the 3-bit binary value of (i). The unused physical registers ($R_2$, $R_3$, $R_4$ and $R_6$) are non-allocated, or have been freed up or de-allocated by retirement of a previously issued instruction or by a flushing operation.

As shown in FIG. 2a, each of N=8 memory cells or entries $211_0, 211_1, \ldots, 211_7$ that make up the FIFO 211 requires a 3-bit read entry port $213_i$ (i.e., $213_{i0}, 213_{i1}, \ldots, 213_{i7}$, for i=1, 2) and a 3-bit write entry port $214_i$ (i.e., $214_{i0}, 214_{i1}, \ldots, 214_{i7}$, for i=1, 2) for the M=2 parallel execution ports $213_i$ and $214_i$ (for i=1, 2) in the machine for reading and writing the register IDs 212, respectively. When a register becomes available for allocation (i.e., when the register is de-allocated), the register's ID 212 is written (in encoded form) at a head position 215 of the FIFO 211 at the next empty one of the entries $211_0, 211_1, \ldots, 211_7$ as indicated by a decoded 8-bit head pointer 216a (00000001 here). In the example shown in FIG. 2a, the (decoded) head pointer 216a (00000001 here) points to entry $211_0$ of the FIFO 211, and the encoded register IDs 212 (000 and 001 here) for the de-allocated physical registers $R_0$ and $R_1$ may be written to entries $211_0$ and $211_1$ of the FIFO 211 in the first clock cycle $CC_1$.

In the allocator 210, the write operation of the de-allocated register IDs 212 to the FIFO 211 involves the head pointer 216a being encoded by a standard write encoder/decoder 218. In the embodiment shown in FIG. 2a, for 8 physical registers, the encoded head pointer 216a is 3 bits wide (000 here in FIG. 2a) and the encoded number of register writes request signal $M_{RegWriteReq}$ 217 is 2 bits wide because decimal numbers 0–2 (binary 00–10) are encoded, as shown in FIG. 2a.

Referring to FIG. 2b, the (encoded) number of register writes request signal $M_{RegWriteReq}$ 217 is latched in a FF latch 219 and the (encoded) head pointer 216a is latched in a FF latch $22_0$, both of which are input to an adder 221 that generates the next (encoded) head pointer 216b (010 here in FIG. 2b). For example, the adder 221 may add the encoded head pointer 216a (000 in FIG. 2a) to a 3-bit binary value for ($M_{RegWriteReq}$), which would be 010 here (after padding the 2-bit binary value of ($M_{RegWriteReq}$) with one 0, yielding 010 here in FIG. 2b).

As the new de-allocated register IDs 212 (000 and 001 in FIG. 2a) are written to the next empty entries $211_0, 211_1, \ldots, 211_7$ ($211_0$ and $211_1$ in FIG. 2a), the head pointer 216a is incremented. The head pointer 216a is modulo 8 incremented by the adder 221 so that the head pointer 216a can wrap around the FIFO 211 (which is preferably circular) to the first entry $211_0$ when the head pointer 216a advances past the last entry $211_7$ (since, for example, 7+1=6+2=8=0 mod 8).

As shown in FIG. 2b, the write encoder/decoder 218 decodes the next (encoded) head pointer 216b, and is coupled to each of the entries $211_0, 211_1, \ldots, 211_7$ of the FIFO 211 via the write enable ports $222_0$ and $222_1$ (there are only two write enable ports since M=2) that are 8 bits wide, and via respective 1-bit write entry ports $222_{00}, 222_{01}, \ldots, 222_{30}, 222_{31}, 222_{40}, \ldots, 222_{71}$. In the example shown in FIG. 2b, the next (decoded) head pointer 216b (00000100 in FIG. 2b) points to entry $211_2$ of the FIFO 211, and the encoded register ID 212 (101 here) for the de-allocated physical register $R_5$ may be written to entry $211_2$ of the FIFO 211 in the next clock cycle $CC_2$.

As shown in FIG. 2c, the (encoded) number of register writes request signal $M_{RegWriteReq}$ 217 (1 here, since $M_{RegWriteReq}$=1 in the clock cycle $CC_2$) is again latched in the FF latch 219 and the (encoded) head pointer 216b (010 in FIG. 2b) is latched in the FF latch $22_0$, both of which are again input to the adder 221 that generates yet another (encoded) head pointer 216c (011 here) so that the (decoded) head pointer 216c (00001000 here) points to entry $211_3$ of the FIFO 211. For example, the adder 221 may add the encoded head pointer 216b (010 in FIG. 2b) to a 3-bit binary value for ($M_{RegWriteReq}$), which would be 001 here (after padding the 2-bit binary value of ($M_{RegWriteReq}$) with one 0, yielding 011 here in FIG. 2c). The encoded register ID 212 (111 here) for the de-allocated physical register $R_7$ may then be written to entry $211_3$ of the FIFO 211 in the clock cycle $CC_3$ following the clock cycle $CC_2$.

Referring to FIGS. 2a–c, when an instruction requests a physical register, that request is serviced by reading the next available register ID 212 at a tail 223 of the FIFO 211 as indicated by a tail pointer 224. The tail pointer 224 is incremented in a similar manner to the incrementing of the head pointer 216. When either the head pointer 216 or the tail pointer 224 reaches the last entry (e.g., $211_7$ here) in the FIFO 211 and is then advanced or incremented, the respective pointer wraps around to the first entry (e.g., $211_0$ here) in the FIFO 211.

As shown in FIG. 2a, when an instruction requests a physical register (i.e., when a register is to be allocated), the register's ID 212 is read (in encoded form) at a tail position 223 of the FIFO 211 as indicated by the decoded 8-bit tail pointer 224a (00010000 here). In the example shown in FIG. 2a, the (decoded) tail pointer 224a (00010000 here) points to entry $211_4$ of the FIFO 211, and the encoded register IDs 212 (010 and 011 here) for the ready-to-be-allocated physical registers $R_2$ and $R_3$ may be read from entries $211_4$ and $211_5$ of the FIFO 211 in the first clock cycle $CC_1$. In general, as discussed above, the encoded value of the register ID 212 for physical register $R_i$, for i=0, 1, ..., 7, is given by the 3-bit binary value of (i).

In the allocator 210, the read operation of the ready-to-be allocated register IDs 212 from the FIFO 211 involves the tail pointer 224a being encoded by a standard read encoder/decoder 238. In the embodiment shown in FIG. 2a, for 8 physical registers, the encoded tail pointer 224a is 3 bits wide (100 here in FIG. 2a) and the encoded number of register reads request signal $M_{RegReadReq}$ 237 is 2 bits wide (10 here, where the encoded value of $M_{RegReadReq}$ is given by the 2-bit binary value of ($M_{RegReadReq}$)), as shown in FIG. 2a.

Referring again to FIG. 2b, the number of register reads request signal $M_{RegReadReq}$ 237 is latched in a FF latch 239 and the tail pointer 224a is latched in a FF latch 240, both of which are input to an adder 241 that generates the next (encoded) tail pointer 224b (110 here in FIG. 2b). For example, the adder 241 may add the encoded tail pointer 224a (100 in FIG. 2a) to a 3-bit binary value for ($M_{RegReadReq}$), which would be 010 in FIG. 2a (after padding the 2-bit binary value of ($M_{RegReadReq}$) with one 0), yielding 110 which would then be latched in FF latch 240 to become the current tail pointer 224b in the next clock cycle (FIG. 2b).

As the new ready-to-be-allocated register IDs 212 (100 and 110 here in FIG. 2b) for the ready-to-be allocated physical registers $R_4$ and $R_6$ are read from the next full ones of the entries $211_0, 211_1, \ldots, 211_7$ ($211_6$ and $211_7$ here), the tail pointer 224b is incremented. The tail pointer 224b is modulo 8 incremented by the adder 221 so that the tail pointer 224b can wrap around the FIFO 211 (which is preferably circular) to the first entry $211_0$ when the tail pointer 224b advances past the last entry $211_7$ (since, for example, 7+1=6+2=8=0 mod 8).

As shown in FIG. 2b, the read encoder/decoder 238 decodes the (encoded) tail pointer 224b, and is coupled to each of the entries $211_0, 211_1, \ldots, 211_7$ of the FIFO 211 via the read enable ports $242_0$ $_{and\ 242_1}$ (there are only two read enable ports since M=2) that are each 8 bits wide, and via respective 1-bit read entry ports $242_{00}, 242_{01}, \ldots, 242_{40}, 242_{41}, 242_{50}, \ldots, 242_{71}$. In the example shown in FIG. 2b, the (decoded) tail pointer 224b (01000000 here) points to entry $211_6$ of the FIFO 211, and the encoded register IDs 212 (100 and 110 here) for the ready-to-be allocated physical registers $R_4$ and $R_6$ may be read from entries $211_6$ and $211_7$ of the FIFO 211 in the clock cycle $CC_2$.

Referring again to FIG. 2c, the (encoded) number of register reads request signal $M_{RegReadReq}$ 237 (2 here, since $M_{RegReadReq}$=2 in the clock cycle $CC_3$) is again latched in the FF latch 239 and the (encoded) tail pointer 224b (110 in FIG. 2b) is latched in the FF latch 240, both of which are again input to an adder 241 that generates yet another (encoded) tail pointer 224c (000 in FIG. 2c). The current (decoded) tail pointer 224c (00000001 in FIG. 2c) points to entry $211_0$ of the FIFO 211 (since 6+2=8=0 mod 8). For example, the adder 241 may add the encoded tail pointer 224b (110 in FIG. 2b) to a 3-bit binary value for ($M_{RegReadReq}$), which would be 010 in FIG. 2b (after padding the 2-bit binary value of ($M_{RegReadReq}$) with one 0, yielding 000 here in FIG. 2c).

The encoded register ID's 212 (000 and 001 here) for the ready-to-be allocated physical registers $R_0$, $R_1$ may then be read from entries $211_0$ and $211_1$ of the FIFO 211 in the clock cycle $CC_3$ following the clock cycle $CC_2$. At the beginning of the clock cycle $CC_3$, the (decoded) tail pointer 224c (00000001 here in FIG. 2c) appears to trail the (decoded) head pointer 216c (00001000 here) since the tail pointer 224c has wrapped around the circular FIFO 211.

Figure 3:
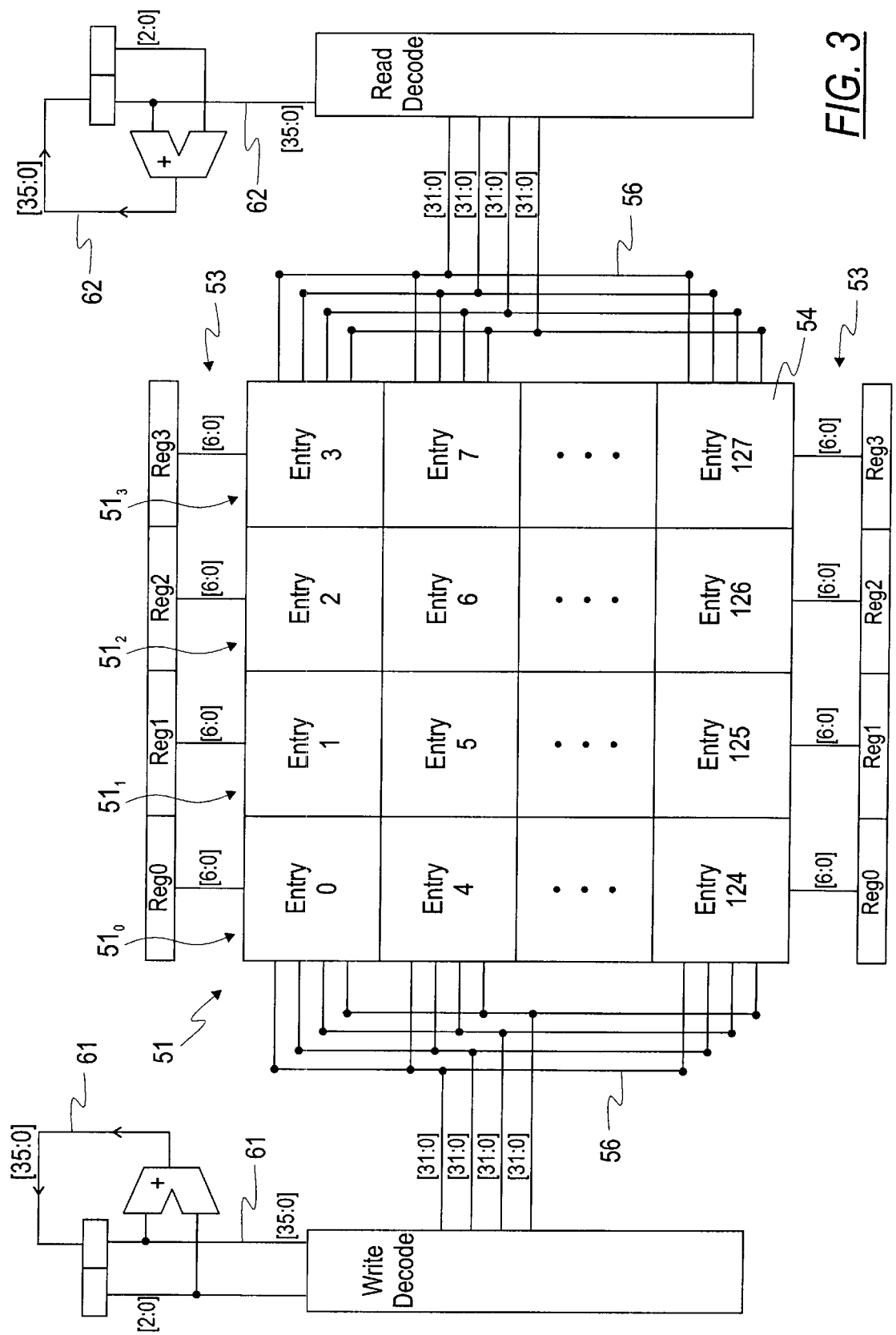
FIG. 3 is a block diagram of an apparatus for performing register allocation in accordance with a second embodiment of the invention.

The embodiment of FIG. 3 has been optimized to conserve chip area and increase the speed of a high-speed superscaler microprocessor. These optimizations enable a more compact, higher performance circuit design by using partially decoded head and tail pointers and in the way the memory is organized. As illustrated in FIG. 3, memory may alternatively be implemented in a register allocator 50 that includes a FIFO 51 having B separate memory banks $51_0, 51_1, 51_2, \ldots, 51_{B-1}$ (e.g., B=4, as shown in FIG. 3), each used for a corresponding parallel execution port, in accordance with another embodiment of the invention. In the allocator 50, each of the memory banks $51_0, 51_1, 51_2, \ldots, 51_{B-1}$ is coupled to a single $\log_2$ N-bit write port 52 (assuming that $N=2^n$) and a single $\log_2$ N-bit read port 53 (assuming that $N=2^n$), as illustrated in FIG. 3, for N=128 and B=4. There may not be a need to read or write any more than to one entry 54 per cycle in each of the memory banks $51_0, 51_1, 51_2, \ldots, 51_{B-1}$. The allocator 50 may, therefore, allow a much smaller and simpler memory cell 54 to be used compared to the allocator 10 in FIG. 1. For example, in one embodiment, only one read port and one write port is required as compared with four read ports and four write ports.

In addition to the reduced size of the memory cell 54, using the multiple memory banks $51_0, 51_1, 51_2, \ldots, 51_{B-1}$ gives the FIFO 51 a much more convenient aspect ratio. If the FIFO 51 were implemented as a single banked structure (as in FIFO 11 of FIG. 1), there would be N entries, each entry being $n=\log_2$ N bits wide (assuming that $N=2^n$). By using multiple (B) memory banks $51_0, 51_1, 51_2, \ldots, 51_{B-1}$, the aspect ratio is (N/B)×(B$\log_2$ N) instead of N×$\log_2$ N. For example, if there are 128 entries 55 (i.e., $55_0, 55_1, \ldots, 55_{N-1}$ with N=128), each entry would be 7 bits wide, giving a FIFO 51 aspect ratio of 128×7 (i.e., the number of entries times the bit width/entry). However, if four memory banks (i.e., B=4) $51_0, 51_1, 51_2, 51_3$ are used instead, this aspect ratio becomes 32×28. Four memory banks $51_0, 51_1, 51_2, 51_3$, therefore, provide a much more square layout, and reduce the length of bit lines 56 by a factor of 4. It is to be understood that the present invention is not limited to 128 registers or four memory banks, and much larger systems could be accommodated in accordance with other embodiments of the present invention.

Control logic (not shown) for the FIFO 11 in FIG. 1 dominates the propagation delay through the allocator 10 (i.e., through the FIFO 11), because the read and write operations of the FIFO 11 memory itself are relatively straightforward, as will be appreciated by those skilled in the art. However, several advantageous innovations may be used to reduce the delay of the FIFO 51 control logic. One way to improve the performance of the control logic would be to use a fully decoded head pointer and tail pointer, in accordance with yet another embodiment of the invention. The fully decoded head pointer and tail pointer are N bits wide and use an N bit datapath to increment and compare the head pointer and the tail pointer.

Advantage can be taken, however, of the banked organization of the FIFO 51 and a B-bit fully decoded bank pointer can be combined with an (N/B)-bit fully decoded row pointer to create a (B+N/B)-bit partially decoded head pointer 61 and a (B+N/B)-bit partially decoded tail pointer 62. Going back to the example in which N=128 and B=4, the fully decoded head pointer 61 or tail pointer 62 would be 128 bits wide, but the partially decoded head pointer 61 or tail pointer 62 would each only be 36 bits wide (the row pointer being 32 bits wide and the bank pointer being 4 bits wide). For B>1 and $N=2^n>2B$, the (B+N/B)-bit partially decoded head pointer 61 and (B+N/B)-bit partially decoded tail pointer 62 are smaller than a fully decoded N-bit head pointer and N-bit tail pointer, so the (B+N/B)-bit partially decoded head pointer 61 and (B+N/B)-bit partially decoded tail pointer 62 are smaller. The partially decoded scheme is smaller and more scaleable than the full-decoded scheme.

In general, the decoded head and tail pointers are $(B-\delta_{1B}+N/B)$-bits wide, where $\delta_{ij}$ is the Kroenecker delta function, with the property that $\delta_{ij}=1$ if i=j, and $\delta_{ij}=0$ otherwise. If B=1, then $\delta_{1B}=\delta_{11}=1$, and $B-\delta_{1B}+N/B=1-\delta_{11}+N/1=N$. For example, as in the embodiment as shown in FIG. 1, where B=1, the (fully) decoded head pointer 16 and (fully) decoded tail pointer 24 are N=128 bits wide. However, if B>1, then $\delta_{1B}=0$, and $B-\delta_{1B}+N/B=B+N/B$. For example, as in the embodiment as shown in FIG. 3, where B=4, the (partially) decoded head pointer 61 and (partially) decoded tail pointer 62 are each (4+N/4)=(4+128/4)=(4+32)=36 bits wide.

Using this partial decode embodiment also simplifies the partially decoded pointers 61, 62 update and comparison logic (not shown) compared to that of fully encoded pointers. To increment the partially decoded pointers 61, 62, the bank pointer may simply be rotated by 0 to (B−1) positions (e.g., 0–3 positions), and the row pointer may be shifted by 1 if the bank pointer wraps around once. For the sake of comparison, as discussed above, the partially decoded head pointer 61 is required to be less than or equal to the partially decoded tail pointer 62, since otherwise a stall may occur in the next clock cycle. The partially decoded tail pointer 62 need only exceed the head pointer 61 by at least M, since a maximum of M registers can be allocated per cycle. However, if the head pointer 61 happens to be greater than the tail pointer 62, the row portion of the head pointer 61 must be equal to that of the tail pointer 62 or at most 1 greater (i.e., rotated by one bit position to the left). If the row portions are equal, a comparison of the bank portions of the pointers 61, 62 is needed to determine if the partially decoded head pointer 61 is greater than the partially decoded tail pointer 62. This can be done with a simple AND-OR logic gate (not shown) because of the relatively small number of memory banks $51_0, 51_1, 51_2, \ldots, 51_{B-1}$. In the embodiment illustrated in FIG. 3, the bank pointer is 4-bits and the row pointer is 32-bits and the machine can allocate between zero and four registers per clock cycle. Therefore, for this example, the bank pointer must be shifted by zero to four positions and the row pointer must be shifted by zero to one positions. For example, FIG. 4a illustrates the initial state of the tail row pointer to be 0000 ... 0001 and the tail bank pointer to be 1000 (hereinafter, only the last four bits of the 32-bit tail row pointer will be shown). FIG. 4b illustrates the subsequent state, after one clock cycle, of the tail row pointer as being 0010 and the tail bank pointer as being 0100. In this one clock cycle, three registers were allocated, i.e., registers 3, 4, and 5 were allocated.

There are several ways to compare the pointers 61 and 62. One way is to compare the head and tail pointers before allocating the registers to make sure there are more registers available than are being requested. First, the head and tail pointers are compared to make sure there are more registers available than the maximum number of registers that can be requested in one clock cycle (in this example, up to four registers can be requested in one clock cycle). Thus, at least four registers must be available prior to allocation. Or, put another way, there can not be only zero to three registers available.

Figure 5A:
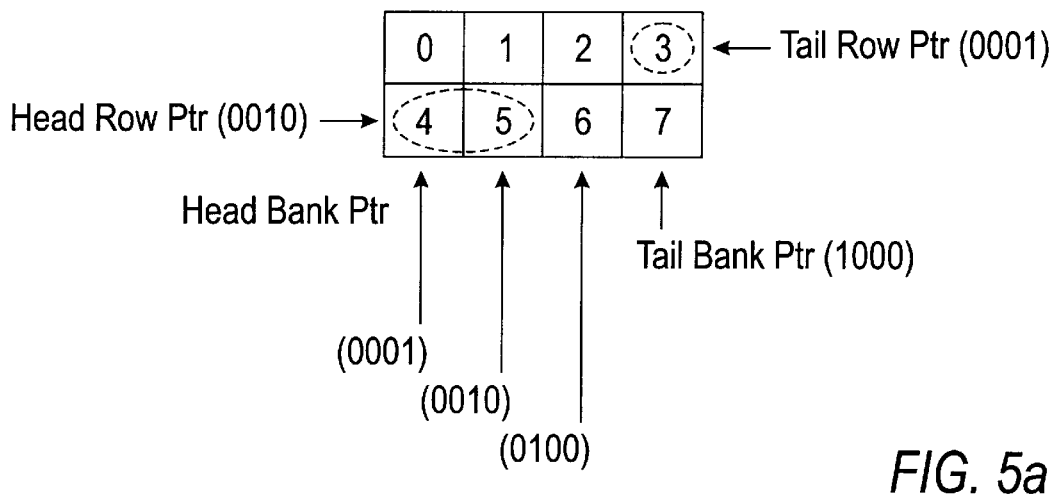
FIG. 5a is a block diagram illustrating an example of how the head and tail pointer comparison is implemented.

For example, if the row pointers are equal and the wrap bit is set, there are only between zero and three registers available. In that case, there are less than four registers available so the bank portions of the pointers 61 and 62 need not even be compared. If the head row pointer is one greater than the tail row pointer, between one and seven registers are available. Therefore, if only one to three registers are available, then there are not enough registers available for allocation. Evaluating whether only zero to three registers are available for allocation (instead of evaluating whether there are between four and 128 registers available) reduces the amount of logic required. FIG. 5a, illustrates the position of the tail row pointer (000 . . . 0001), the tail bank pointer (1000), the head row pointer (000 . . . 0010) and the head bank pointer (001, 0010 or 0100). Hereinafter, only the last four bits of the 32-bit head and tail row pointers will be illustrated. Based on the position of the tail row pointer, the tail bank pointer, the head row pointer and the head bank pointer, there are up to three available registers depending on the position of the head bank pointer, i.e., entry numbers 3, 4, and 5 are available (or, entry numbers 3 and 4 are available, or entry number 3 is available).

Figure 5B:
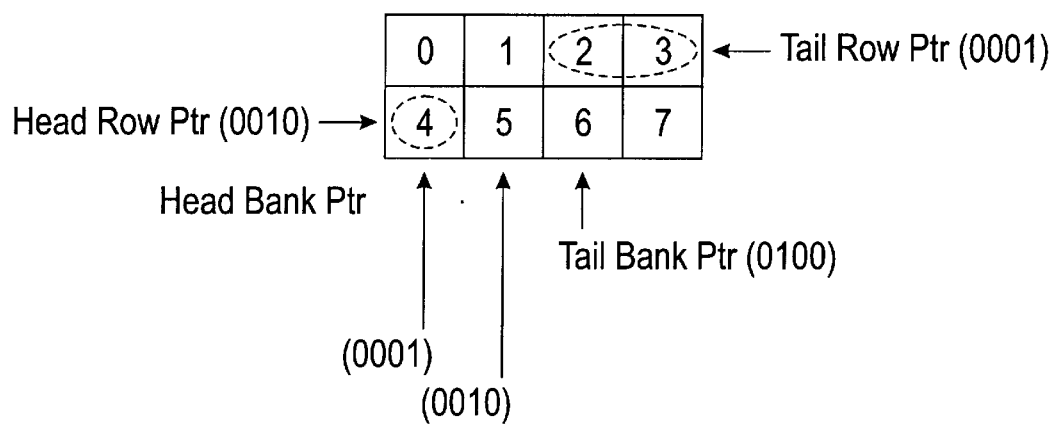
FIG. 5b is a block diagram illustrating an example of how the head and tail pointer comparison is implemented.

FIG. 5b, illustrates the position of the tail row pointer (0001), the tail bank pointer (0100), the head row pointer (0010) and the head bank pointer (0001, or 0010). Based on the position of the tail row pointer, the tail bank pointer, the head row pointer and the head bank pointer, there are either two or three available registers depending on the position of the head bank pointer, i.e., entry numbers 2 and 3 are available (or, entry numbers 2, 3 and 4 are available).

Figure 5C:
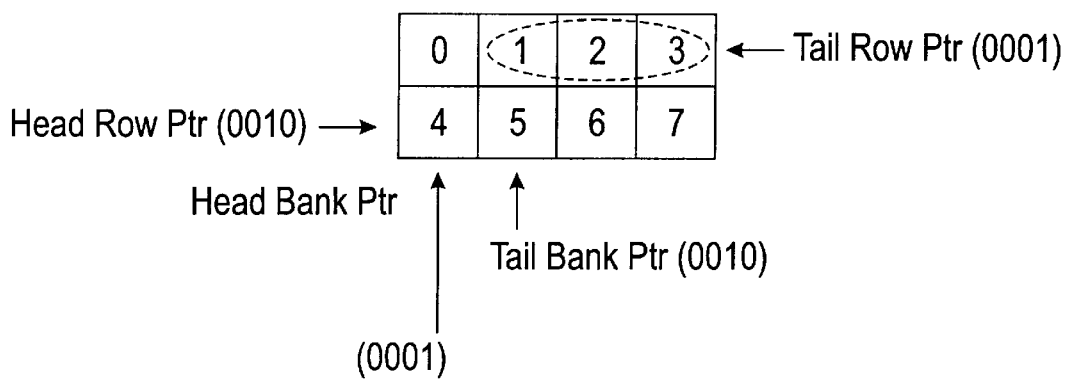
FIG. 5c is a block diagram illustrating an example of how the head and tail pointer comparison is implemented.

FIG. 5c, illustrates the position of the tail row pointer (0001), the tail bank pointer (0010), the head row pointer (0010) and the head bank pointer (0001). Based on based on the position of the tail row pointer, the tail bank pointer, the head row pointer and the had bank pointer, there are three available registers, i.e., entry numbers 1, 2 and 3 are available. By comparing the head and tail pointers in the manner described above before allocating the registers, the logic required for the comparison is reduced.

The particular embodiments disclosed above are illustrative only, as the invention may be modified and practiced in different but equivalent manners apparent to those skilled in the art having the benefit of the teachings herein. For example, it is intended that reversal of the roles of the head and tail pointers 61 and 62 may be implemented in other embodiments (not shown) within the spirit and scope of the invention, as similarly discussed above for the exemplary embodiment shown in FIG. 1. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A register allocator comprising:
    a plurality of N allocatable memory cells arranged in B banks having N/B rows each so that each of the N allocatable memory cells is capable of storing a register identifier;
    a plurality of M parallel execution write data ports coupled to the plurality of N allocatable memory cells so as to be capable of writing a de-allocated register identifier to a first associated memory cell;
    a plurality of M parallel execution read data ports coupled to the plurality of N allocatable memory cells so as to be capable of reading an allocated register identifier from a second associated memory cell;
    a plurality of M (N/B)-bit write enable ports coupled to the plurality of N allocatable memory cells by N/B 1-bit write entry ports;
    a plurality of M (N/B)-bit read enable ports coupled to the plurality of N allocatable memory cells by N/B 1-bit read entry ports;
    a decoded $(B-\delta_{1B}+N/B)$-bit head pointer decoded in a write decoder and coupled to the plurality of M (N/B)-bit write enable ports; and
    a decoded $(B-\delta_{1B}+N/B)$-bit tail pointer decoded in a read decoder and coupled to the plurality of M (N/B)-bit read enable ports, wherein up to M of the plurality of N allocatable memory cells are allocatable on a first-in-first-out basis determined by respective positions of the decoded $(B-\delta_{1B}+N/B)$-bit head pointer and the decoded $(B-\delta_{1B}+N/B)$-bit tail pointer.

2. The register allocator of claim 1, wherein the respective positions of the decoded $(B-\delta_{1B}+N/B)$-bit head pointer and the decoded $(B-\delta_{1B}+N/B)$-bit tail pointer are separately incrementable.

3. The register allocator of claim 1, wherein $N=2^n$.

4. The register allocator of claim 3, wherein each of the N allocatable memory cells is capable of storing an n-bit register identifier.

5. The register allocator of claim 4, wherein each of the plurality of M parallel execution write data ports is n bits wide.

6. The register allocator of claim 4, wherein each of the plurality of M parallel execution read data ports is n bits wide.

7. The register allocator of claim 1, wherein $N=2^{(n+\alpha)}$, for $0<\alpha<1$.

8. The register allocator of claim 7, wherein each of the N allocatable memory cells is capable of storing an (n+1)-bit register identifier.

9. The register allocator of claim 8, wherein each of the plurality of M parallel execution write data ports is (n+1) bits wide.

10. The register allocator of claim 8, wherein each of the plurality of M parallel execution read data ports is (n+1) bits wide.

11. A register allocator comprising:
    a plurality of $N=2^n$ allocatable memory cells arranged in B banks having N/B rows each so that each of the N allocatable memory cells is capable of storing an n-bit register identifier;
    a plurality of M n-bit parallel execution write data ports coupled to the plurality of N allocatable memory cells so as to be capable of writing a de-allocated n-bit register identifier to a first associated memory cell;
    a plurality of M n-bit parallel execution read data ports coupled to the plurality of N allocatable memory cells so as to be capable of reading an allocated n-bit register identifier from a second associated memory cell;
    a plurality of M (N/B)-bit write enable ports coupled to the plurality of N allocatable memory cells by N/B 1-bit write entry ports;
    a plurality of M (N/B)-bit read enable ports coupled to the plurality of N allocatable memory cells by N/B 1-bit read entry ports;

a decoded ($B-\delta_{1_B}+N/B$)-bit head pointer decoded in a write decoder and coupled to the plurality of M (N/B)-bit write enable ports; and a decoded ($B-\delta_{1_B}+N/B$)-bit tail pointer decoded in a read decoder and coupled to the plurality of M (N/B)-bit read enable ports, wherein up to M of the plurality of N allocatable memory cells are allocatable on a first-in-first-out basis determined by respective positions of the decoded ($B-\delta_{1_B}+N/B$)-bit head pointer and the decoded ($B-\delta_{1_B}+N/B$)-bit tail pointer.

12. The register allocator of claim 11, wherein the respective positions of the decoded ($B-\delta_{1_B}+N/B$)-bit head pointer and the decoded ($B-\delta_{1_B}+N/B$)-bit tail pointer are separately incrementable.

13. The register allocator of claim 11, wherein N is at least 128, n is at least 7, M is at least 4 and B=1.

14. The register allocator of claim 11, wherein N is at least 128, n is at least 7, M is at least 4 and B is at least 2.

15. The register allocator of claim 11, wherein N is at least 128, n is at least 7, M is at least 4 and B is at least 4.

16. A method of allocating registers, the method comprising:

arranging a plurality of N allocatable memory cells in B banks having N/B rows each so that each of the N allocatable memory cells is capable of storing a register identifier;

writing a de-allocated register identifier to a first associated memory cell via a plurality of M parallel execution write data ports coupled to the plurality of N allocatable memory cells;

reading an allocated register identifier from a second associated memory cell via a plurality of M parallel execution read data ports coupled to the plurality of N allocatable memory cells;

allocating up to M of the plurality of N allocatable memory cells on a first-in-first-out basis determined by respective positions of a decoded ($B-\delta_{1_B}+N/B$)-bit head pointer and a decoded ($B-\delta_{1_B}+N/B$)-bit tail pointer.

17. The method of claim 16, further including the step of incrementing the respective positions of the decoded ($B-\delta_{1_B}+N/B$)-bit head pointer and the decoded ($B-\delta_{1_B}+N/B$)-bit tail pointer separately.

18. The method of claim 16, wherein $N=2^n$.

19. The method of claim 18, wherein each of the N allocatable memory cells is capable of storing an n-bit register identifier.

20. The method of claim 19, wherein each of the plurality of M parallel execution write data ports is n bits wide.

21. The method of claim 19, wherein each of the plurality of M parallel execution read data ports is n bits wide.

22. The method of claim 21, wherein each of the plurality of M parallel execution write data ports is n bits wide.

23. The method of claim 22, wherein N is at least 128, n is at least 7, M is at least 4 and B=1.

24. The method of claim 22, wherein N is at least 128, n is at least 7, M is at least 4 and B is at least 2.

25. The method of claim 22, wherein N is at least 128, n is at least 7, M is at least 4 and B is at least 4.

26. The method of claim 16, wherein $N=2^{(n+\alpha)}$, for $0<\alpha<1$.

27. The method of claim 26, wherein each of the N allocatable memory cells is capable of storing an (n+1)-bit register identifier.

28. The method of claim 27, wherein each of the plurality of M parallel execution write data ports is (n+1) bits wide.

29. The method of claim 27, wherein each of the plurality of M parallel execution read data ports is (n+1) bits wide.

30. The method of claim 29, wherein each of the plurality of M parallel execution write data ports is (n+1) bits wide.

31. The method of claim 30, wherein N is at least 128, n is at least 7, M is at least 4 and B=1.

32. The method of claim 30, wherein N is at least 128, n is at least 7, M is at least 4 and B is at least 2.

33. The method of claim 30, wherein N is at least 128, n is at least 7, M is at least 4 and B is at least 4.

34. A method of allocating registers, the method comprising:

arranging a plurality of $N=2^n$ allocatable memory cells in B banks having N/B rows each so that each of the N allocatable memory cells is capable of storing an n-bit register identifier;

writing a de-allocated n-bit register identifier to a first associated memory cell via a plurality of M n-bit parallel execution write data ports coupled to the plurality of N allocatable memory cells;

reading an allocated n-bit register identifier from a second associated memory cell via a plurality of M n-bit parallel execution read data ports coupled to the plurality of N allocatable memory cells;

coupling a plurality of M (N/B)-bit write enable ports to the plurality of N allocatable memory cells by N/B 1-bit write entry ports;

coupling a plurality of M (N/B)-bit read enable ports to the plurality of N allocatable memory cells by N/B 1-bit read entry ports;

coupling a decoded ($B-\delta_{1_B}+N/B$)-bit head pointer decoded in a write decoder to the plurality of M (N/B)-bit write enable ports;

coupling a decoded ($B-\delta_{1_B}+N/B$)-bit tail pointer decoded in a read decoder to the plurality of M (N/B)-bit read enable ports;

allocating up to M of the plurality of N allocatable memory cells on a first-in-first-out basis determined by respective positions of the decoded ($B-\delta_{1_B}+N/B$)-bit head pointer and the decoded ($B-\delta_{1_B}+N/B$)-bit tail pointer.

35. The method of claim 34, further including the step of incrementing the respective positions of the decoded ($B-\delta_{1_B}+N/B$)-bit head pointer and the decoded ($B-\delta_{1_B}+N/B$)-bit tail pointer separately.

36. The method of claim 34, wherein N is at least 128, n is at least 7, M is at least 4 and B=1.

37. The method of claim 34, wherein N is at least 128, n is at least 7, M is at least 4 and B is at least 2.

38. The method of claim 34, wherein N is at least 128, n is at least 7, M is at least 4 and B is at least 4.

* * * * *